United States Patent
Qin et al.

(10) Patent No.: US 8,478,900 B2
(45) Date of Patent: Jul. 2, 2013

(54) DETERMINING MISCONNECTION OF AN ELECTRONIC DEVICE TO A NETWORK DEVICE USING ZONE INFORMATION

(75) Inventors: Lijun Qin, College Station, TX (US); Balaji Natrajan, Houston, TX (US); Sohail Hameed, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 126 days.

(21) Appl. No.: 13/110,423

(22) Filed: May 18, 2011

(65) Prior Publication Data

US 2012/0297052 A1    Nov. 22, 2012

(51) Int. Cl.
*G06F 11/00* (2006.01)

(52) U.S. Cl.
USPC ............. 709/238; 709/224; 709/228; 714/43; 714/4.1

(58) Field of Classification Search
USPC ................... 709/238, 224, 227, 228; 714/43, 714/4.1–4.5
See application file for complete search history.

(56) References Cited

U.S. PATENT DOCUMENTS

| 7,672,812 | B2 | 3/2010 | Stoupis |
| 7,673,185 | B2 | 3/2010 | Kalwitz |
| 2006/0271677 | A1* | 11/2006 | Mercier ......................... 709/224 |
| 2006/0277324 | A1 | 12/2006 | Aldereguia |
| 2008/0168161 | A1 | 7/2008 | Lucas |
| 2011/0296230 | A1* | 12/2011 | Chen et al. ........................ 714/3 |
| 2012/0233491 | A1* | 9/2012 | Chen et al. ........................ 714/3 |

OTHER PUBLICATIONS

Website—www.publib.boulder.ibm.com—POWER6 Information dated on or before Feb. 8, 2011 (5 pages).
Jackson, MindShare Technology Series, SAS Storage Architecture, SAS Storage Architecture (Revision 1.1) Sep. 2005—Chapters 1-6 (51 pages).
Jackson, MindShare Technology Series, SAS Storage Architecture, SAS Storage Architecture (Revision 1.1) Sep. 2005—Chapters 7-17 (55 pages).
Jackson, MindShare Technology Series, SAS Storage Architecture, SAS Storage Architecture (Revision 1.1) Sep. 2005—Chapter 18-20 and Appendices (40 pages).

* cited by examiner

*Primary Examiner* — Kenneth R Coulter

(57) ABSTRACT

Connection of an electronic device to a particular port of the network device is detected. It is determined based on zone information whether a misconnection has occurred. The zone information defines plural zones.

19 Claims, 5 Drawing Sheets

DETERMINING MISCONNECTION OF AN ELECTRONIC DEVICE TO A NETWORK DEVICE USING ZONE INFORMATION

BACKGROUND

In a network environment, a relatively large number of electronic devices can be coupled with each other. One type of network environment is a storage network environment, in which storage devices in respective storage systems are made available to initiators. Storage devices can be provided in respective storage enclosures. The storage enclosures can in turn be connected to one or multiple switches to allow initiators to access the storage enclosures.

BRIEF DESCRIPTION OF THE DRAWINGS

Some embodiments are described with respect to the following figures.

DETAILED DESCRIPTION

Figure 1:
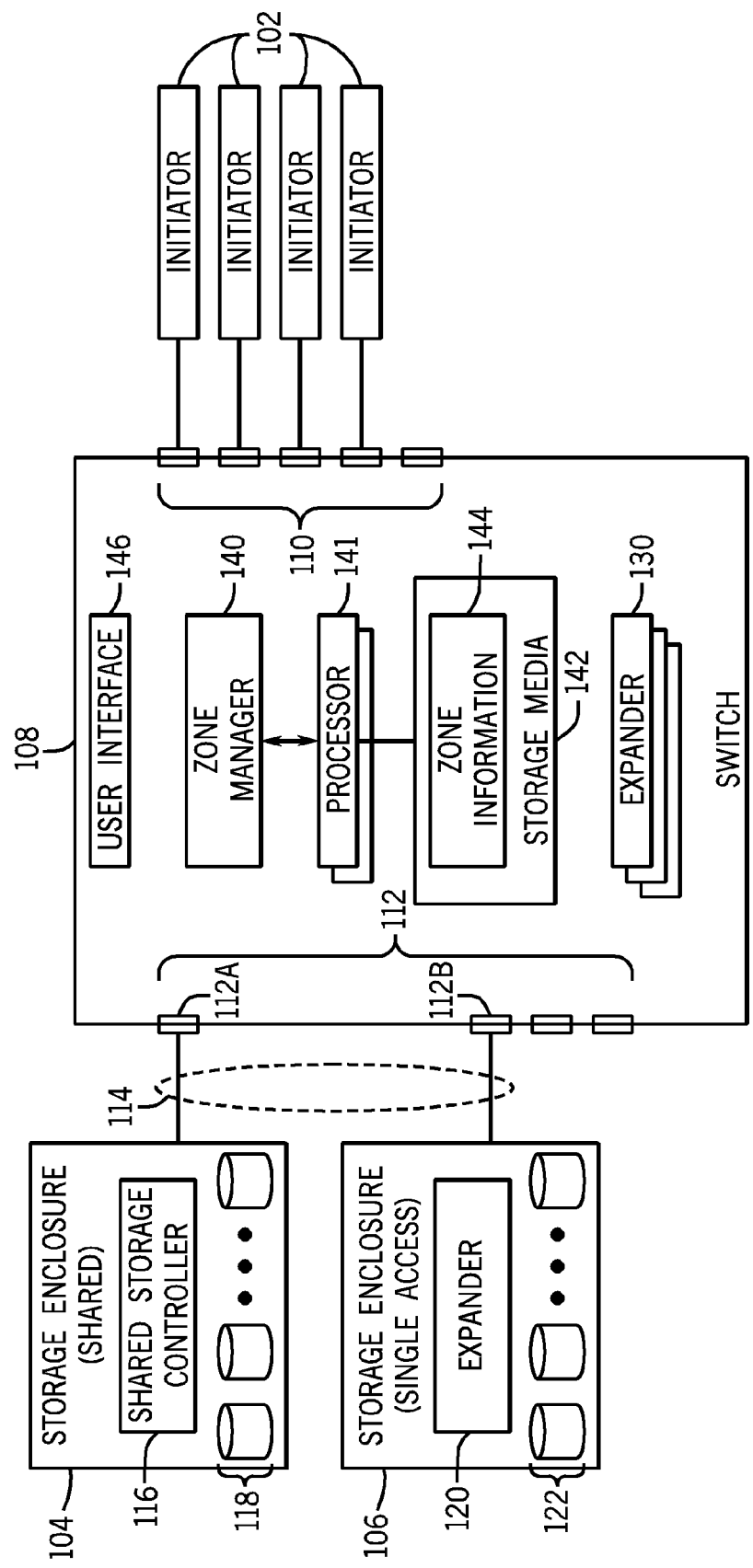
FIG. 1 is a block diagram of an example arrangement incorporating some implementations.

A storage network environment can include initiators coupled through one or multiple switches to storage enclosures, where each storage enclosure has one or multiple storage devices. A "storage enclosure" often refers to a system that contains multiple storage devices; however, in other examples, a "storage enclosure" can also refer to an individual storage device. An "initiator" is an electronic device (e.g. computer, personal digital assistant, electronic appliance, etc.) that is able to access (read and write) data stored in storage devices of the storage enclosures. A "switch" refers to a network device that is able to selectively allow communication between one set of electronic devices (e.g. initiators) and a second set of electronic devices (e.g. storage enclosures). A switch can have multiple ports that are connected to initiators or storage enclosures. A "port" refers to a connection or other type of interface to allow an electronic device to communicate with another device.

Although reference is made to a storage network environment that has storage enclosures accessible by initiators, note that techniques or mechanisms according to some implementations can be applied in other network environments, such as a data communication network environment. More generally, techniques or mechanisms according to some implementations are applicable to any type of network device that has multiple ports to allow for communication between electronic devices, and that uses a zoning mechanism to control access (as discussed further below).

Cables are used to connect storage enclosures to ports of a network device such as a storage switch. A cable can be an electrical cable (to communicate electrical signals) or an optical cable (to communicate optical signals). In a system that has a relatively large number of devices, there can be a relatively large number of cables. As part of an initial setup of a system, a network operator or other user can carefully connect cables between the ports of switch(es) and respective storage enclosures, to ensure that the storage enclosures are connected to correct ports of the switch(es).

However, after initial system setup, there are various scenarios where a user may have to perform a further cabling procedure to connect a storage enclosure to a switch using a cable. For example, the user may have determined that a cable is faulty or has failed, such that the cable is replaced with a new cable. Alternatively, the user may decide to add a new storage enclosure. As yet another alternative, the presence of faulty or failed components in a storage enclosure may prompt disconnection of a cable between the storage enclosure and the switch, followed by re-connection of the cable between the storage enclosure and the switch after the faulty or failed components have been repaired or replaced.

During a cabling procedure, a user may connect a cable to the wrong port of a switch. This is especially likely if there are a relatively large number of cables present. Misconnecting a cable to a wrong port of a switch can result in operation failure and even data loss when an initiator attempts to access a storage enclosure.

In accordance with some implementations, techniques or mechanisms are provided to detect misconnection of a cable (or other type of communication medium) between a storage enclosure and a switch. Although the discussion herein refers to misconnections between storage enclosures and switches, note that in alternative implementations, it is possible for a misconnection to occur between a switch and an initiator. Techniques or mechanisms according to some implementations are also applicable to detect a misconnection between an initiator and a switch. Also, although reference is made to a "switch" in this discussion, note that misconnections can occur between an electronic device (e.g. storage enclosure or initiator) and another type of network device that has ports. Such misconnections between an electronic device and a port of a network device can also be detected using techniques or mechanisms according to some implementations.

In a storage network environment, multiple zone groups can be defined, where the ports of a switch are associated with respective different zone groups. The storage enclosure connected to a switch port in a first zone group may be accessible by a first initiator, the storage enclosure connected to a switch port in a second zone group may be accessible by a second initiator, and so forth. Certain zone groups can be multi-initiator zone groups where a switch port in such a multi-initiator zone group is accessible by multiple initiators. Multiple zone groups can be defined to provide more efficient traffic management and also to provide for security. Each zone group can be accessed by at least one initiator, and each zone group has at least one target device (e.g. a storage enclosure). An initiator assigned to a given zone group can access any target device within the given zone group. In the ensuing discussion, "zone" and "zone group" are used interchangeably. A zone or zone group can refer to some predefined collection of components, such as ports, target devices, initiators, and other components discussed further below.

Misconnecting a storage enclosure to a wrong port of the switch can result in the storage enclosure being placed into an incorrect zone. For example, assume that a first zone includes a first switch port, while a second zone includes a second switch port. The first switch port (assumed to be connected to a first storage enclosure) is accessible by a first initiator. If a user misconnects the first storage enclosure to the second switch port rather than the first switch port, then when the first initiator attempts to access the first storage enclosure, the first initiator may not be able to access the first storage enclosure.

Moreover, an additional issue occurs when a storage enclosure configured for single-initiator access is incorrectly connected to a switch port that is zoned for multi-initiator access (a storage port where multiple initiators can access the same port). Multiple initiators accessing a storage enclosure configured for single-initiator access may cause potential data loss, such as due to one initiator overwriting the data written by another initiator.

FIG. 1 depicts an example storage network arrangement that has initiators 102, storage enclosures 104, 106, and a switch 108. Although just one switch is depicted in FIG. 1, it is noted that in alternative implementations, multiple switches can be provided, such as to allow for redundancy or for load balancing.

Examples of the initiators 102 include any electronic device that is able to send requests to access data in the storage enclosures 104, 106. As examples, the initiators 102 can include storage server computers. Alternatively, initiators can be portions of a storage server computer, or any other type of electronic device.

The switch 108 couples the initiators 102 to the storage enclosures 104, 106. The switch 108 has a first set of ports 110 connected to respective initiators 102, and a second set of ports 112 connected to respective storage enclosures 104, 106. In some examples, the ports 112 in the second set are connected by cables 114 to respective storage enclosures 104, 106. More generally, the ports 112 are connected by respective communication media to the storage enclosures 104, 106. In FIG. 1, the storage enclosure 104 is connected to switch port 112A, while the storage enclosure 106 is connected to switch port 112B.

The first set of ports 110 can be connected to the initiators 102 using one of various connection mechanisms, such as by use of cables, connectors, and so forth.

The storage enclosure 104 is a shared storage enclosure including a shared storage controller 116 that manages access of storage modules 118 in the storage enclosure 104. The storage modules 118 can be implemented with disk-based storage devices or other types of storage devices. The shared storage controller 116 is "shared" in the sense that the shared storage controller 116 supports access of the storage enclosure 104 by multiple initiators 102. The port 112A to which the storage enclosure 104 is connected is part of a first zone that allows multi-initiator access.

In contrast, according to some examples, the storage enclosure 106 is a single-access storage enclosure, which has an expander (or expanders) 120 to allow access to storage modules 122. An expander performs switch-like functions, such as routing, to allow initiators and targets to communicate with each other. An example of the single-access storage enclosure 106 is a JBOD (just a bunch of disks). Unlike the shared storage controller 116 in the storage enclosure 104, the expander 120 does not enforce access restrictions—as a result, to achieve data integrity of the data stored in the storage enclosure 106, the storage enclosure 106 is connected to the port 112B that provides single-initiator access. In this way, the storage enclosure 106 is accessible by just one initiator.

As further depicted in FIG. 1, the switch 108 includes multiple expanders 130. In alternative implementations, instead of expanders 130, the switch 108 can include other types of switching circuitry that interconnect the ports 112 with ports 110.

The switch 108 also includes a zone manager 140, which is able to access zone information 144 stored in storage media 142. If the zone manager 140 is configured as machine-readable instructions, then the zone manager is executable on a processor 141 (or multiple processors). Alternatively, the zone manager 140 can be implemented with hardware.

The storage media 142 can be implemented with one or multiple disk-based storage devices and/or integrated circuit storage devices. The zone information 144 defines multiple zones. In some examples, a zone is a logical group of devices, including expander(s) 130 in the switch 108, port(s) of the switch 108, and a storage enclosure (or multiple storage enclosures).

The zone manager 140 configures certain components (e.g. ports and expanders) of the switch 108 with respective zone group information to cause such components to be part of respective zones. For example, the port 112A and corresponding expander(s) can be configured with zone group information for zone 1, while the port 112B and corresponding expander(s) can be configured with zone group information for zone 2.

Figure 2A:
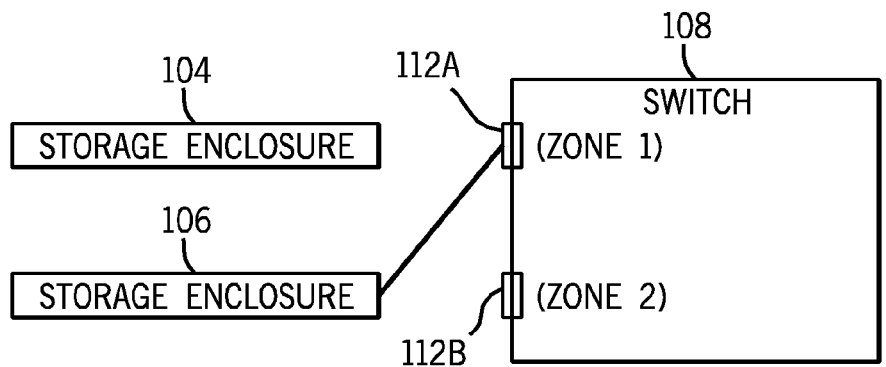
FIGS. 2A and 2B illustrate examples of misconnections detectable using techniques or mechanisms according to some implementations.

As noted above, for various reasons, after a storage network has been initially set up, a user may perform a cabling procedure (to connect a storage enclosure to the switch 108). As a result of the re-cabling procedure, it may be possible for the user to connect a cable to the wrong port of the switch 108. This is shown in FIG. 2A, where it is assumed that the storage enclosures 104 and 106 have been disconnected from the switch 108, and subsequent re-cabling has resulted in the storage enclosure 106 being connected to the port 112A (which was previously connected to storage enclosure 104). Note that the port 112A is supposed to be configured for multi-initiator access. However, the storage enclosure 106 is designed for single-initiator access. As a result, if multiple initiators 102 are allowed to access the storage enclosure 106 through the port 112A, then data corruption may occur when the multiple initiators modify the same piece of data in the storage enclosure 106.

Figure 2B:
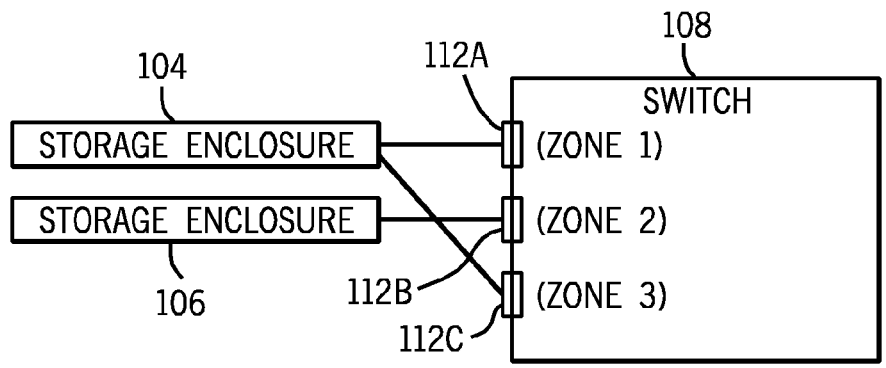

Another example of mis-cabling is depicted in FIG. 2B. In this example, it is assumed that a user wishes to connect the storage enclosure 104 to multiple ports of the switch 108. Connecting the storage enclosure 104 to multiple ports allows for increased bandwidth between the storage enclosure 104 and the switch 108. However, for proper operation, the ports of the switch to which the enclosure 104 are connected should be configured to the same zone. In the example of FIG. 2B, the storage enclosure 104 is connected to the switch port 112A (which is part of zone 1), and to switch port 112C (which is part of zone 3). Such a connection arrangement is improper, and would result in operational failure.

Figure 3:
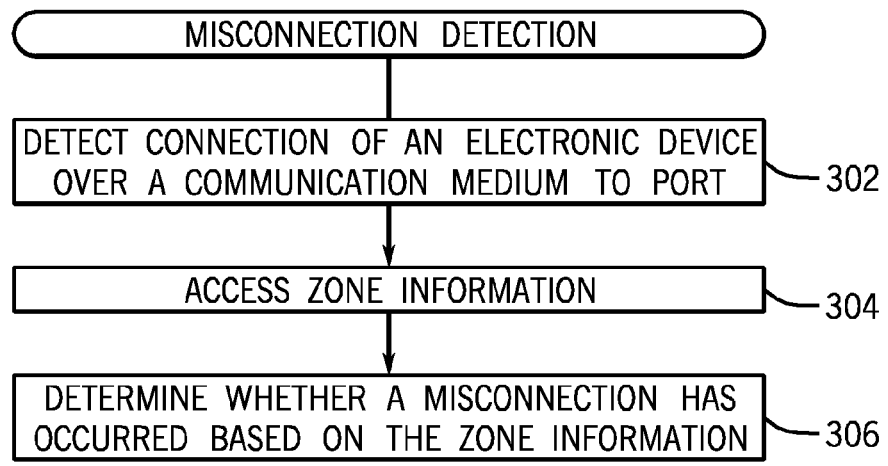
FIG. 3 is a flow diagram of a process of detecting misconnection of an electronic device to a network device, according to some implementations.

FIG. 3 is a flow diagram of a process according to some implementations for detecting misconnection of a storage enclosure to a port of the switch 108. The process of FIG. 3 can be performed by one or multiple components of the switch 108, for example. The components that can perform the tasks of FIG. 3 can include the expander(s) 130 of the switch 108 and the zone manager 140.

The process of FIG. 3 detects (at 302) connection of an electronic device (e.g. storage enclosure) over a communication medium to a particular port of the switch 108. The detection can be performed by an expander that is connected to the particular port.

Next, the process accesses (at 304) zone information (144 in FIG. 1). The access can be performed by the zone manager 140, for example, in response to notification from the expander of detection of connection of the electronic device to the particular port.

The process then determines (at 306) whether a misconnection of the electronic device to the switch 108 has occurred, based on the accessed zone information 144. The determination of whether a misconnection has occurred can be performed by the zone manager 140 and is based on analyzing zone information for the particular port. For example, the zone information for the particular port can indicate that the particular port is part of a multi-access zone. However, the zone manager 140 can detect that the storage enclosure (e.g. 106) that is connected to the communication medium which has been connected to the particular port is a single-initiator access device. As a result, the zone manager 140 can determine, based on the fact that a single-initiator access device has been connected to a multi-initiator access port, that a misconnection has occurred.

As yet another example, the zone manager 140 can also detect misconnection if the zone manager determines that a particular storage enclosure has been connected to multiple switch ports in different zones (such as in the scenario of FIG. 2B).

Once misconnection is detected, the zone manager 140 can cause an alert to be sent, such as through a user interface 146 of the switch 108 or by some other technique (e.g. e-mail).

Figure 4:
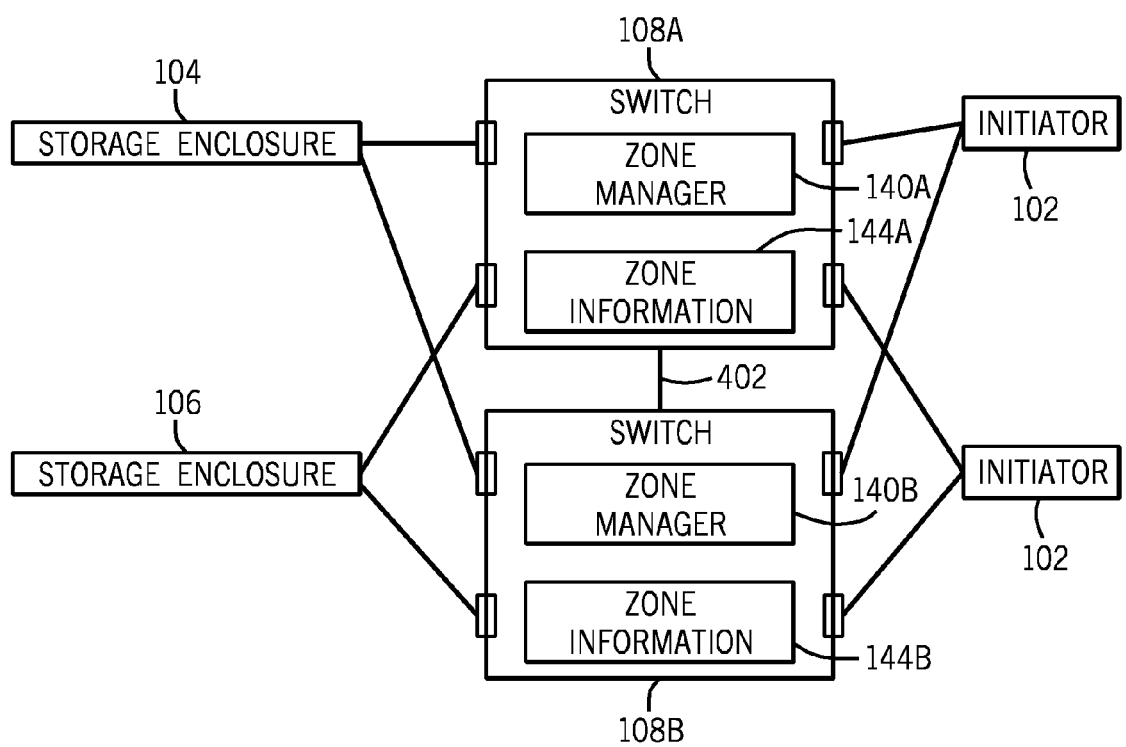
FIG. 4 is a block diagram of another example arrangement incorporating alternative implementations.

FIG. 4 is a block diagram of an alternative arrangement in which multiple switches 108A, 108B are provided between the initiators 102 and the storage enclosures 104, 106. The multiple switches 108A, 108B are provided for purposes of redundancy and load balancing. Each storage enclosure (104 or 106) is connected to both the switch 108A and switch 108B. Thus, as depicted in FIG. 4, the storage enclosure 104 is connected to one port of the switch 108A, and another port of the switch 108B. Similarly, the storage enclosure 106 is connected to a port of the switch 108A and a port of the switch 108B.

As further depicted in FIG. 4, the switches 108A and 108B are able to communicate with each other over a link 402. This allows the switches 108A and 108B to coordinate their efforts in performing communications between the initiators 102 and the storage enclosures 104, 106, and also to determine whether misconnection has occurred, as discussed further below.

The switch 108A includes a zone manager 140A and stores zone information 144A, and the switch 108B includes zone manager 140B and stores zone information 144B. The zone manager 140A or 140B of each of the switches 108A and 108B can detect mis-cabling of a storage enclosure to one of its ports, using techniques as discussed above.

Figure 5:
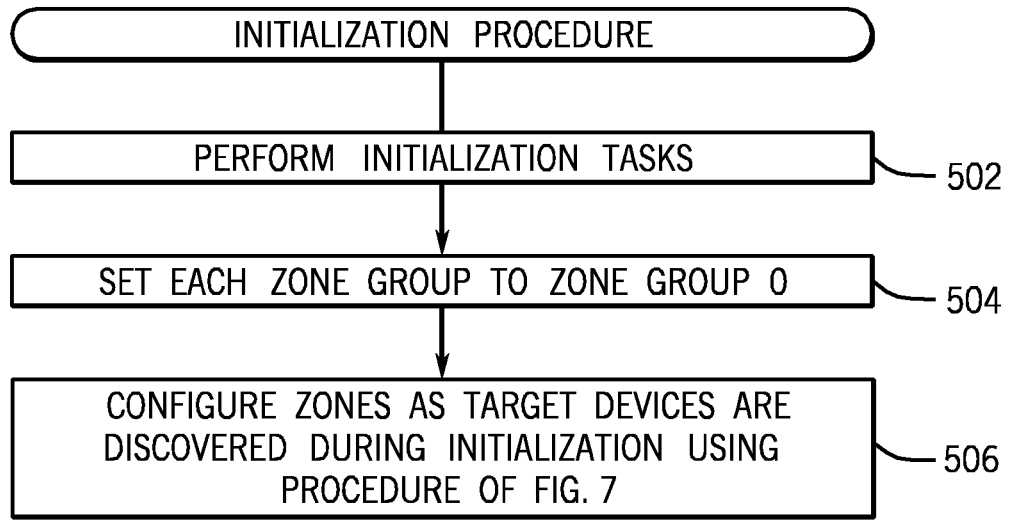
FIGS. 5-7 are flow diagrams of processes to allow for misconnection detection according to alternative implementations.
Figure 6:
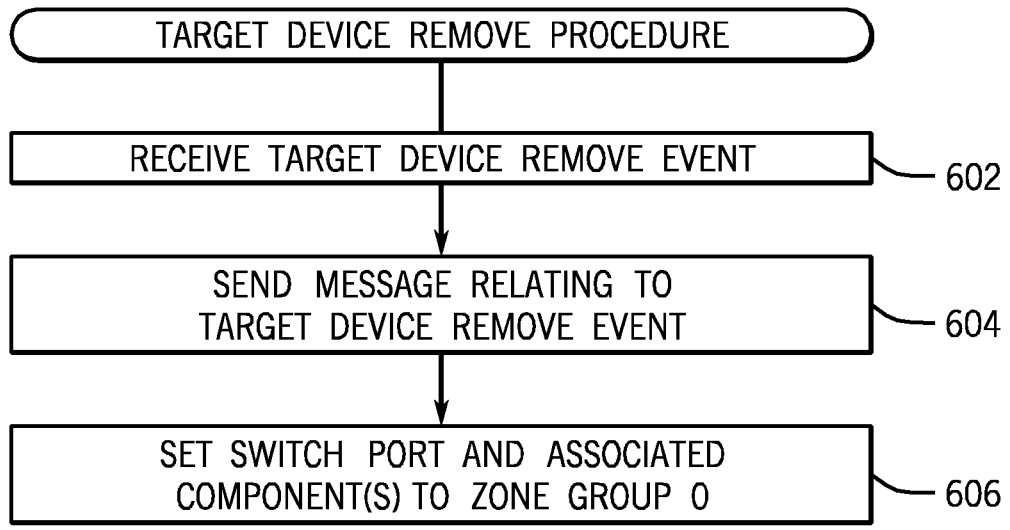
Figure 7:
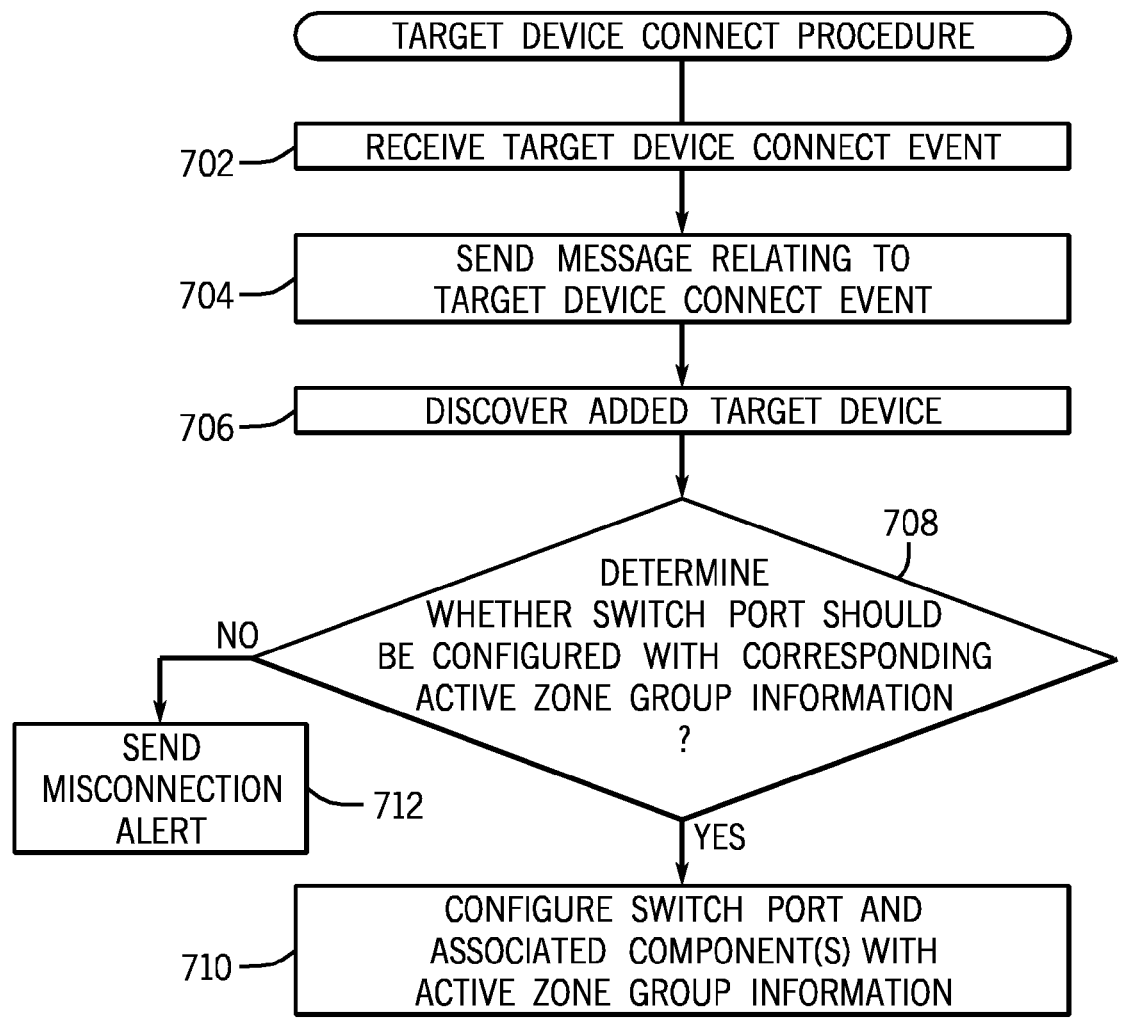

FIGS. 5-7 are flow diagrams of processes according to further implementations that allow for detection of mis-connections to switch ports. As shown in FIG. 5, when a switch (108 in FIG. 1 or 108A or 108B in FIG. 4) is first started, the switch performs (at 502) initialization tasks, such as setting initial configurations of various hardware components, loading selected code, and so forth. As part of the initialization, the zone manager 140 sets (at 504) each of the zone groups to an inactive or "no access" zone group, which is a zone group in which access to a target device, such as the storage enclosure 104 or 106, is disabled. Thus, a port and other component(s) that are part of the inactive zone group cannot be accessed by any initiator.

In some examples, the inactive zone group is referred to as "zone group 0." The zone information 144 (FIG. 1) or 144A or 144B (FIG. 4) contains zone group information for different "active" zone groups. An active zone group differs from zone group 0 in that a target device (or target devices) of the active zone group can be accessed by an initiator (or initiators). The zone group information for an active zone group is referred to as an "active zone group information."

Continuing on with the initialization, if the switch is properly connected to target devices (no misconnection is present) discovered during the initialization procedure of FIG. 5, the zone manager can configure (at 506) respective groups of components with the corresponding active zone group information, using the procedure shown in FIG. 7 as explained below.

FIG. 6 shows a target device remove procedure performed in response to a target device remove event (received at 602). The target device remove event occurs in response to detecting removal of a target device (e.g. storage enclosure 104 or 106) from a port of the switch. In response to the target device remove event (which can be detected by an expander), a message (or other indication) is sent (at 604) by the expander to other components in the switch. In some implementations, the message that is sent at 604 is a broadcast message, such as a broadcast change primitive, that is sent to all the components of the switch, including expanders and the zone manager (and any other component in the switch). In response to receiving the message, the zone manager 140 sets (at 606) the switch port (from which a target device was removed) and associated component(s) (e.g. expander(s)) to zone group 0.

FIG. 7 shows a target device connect procedure performed in response to a target device connect event (received at 702), which occurs when a target device is connected to a switch port (which was previously unconnected). Note that the target device connect event can also be responsive to discovery of a target device during an initialization procedure, such as in FIG. 5. In response to the target device connect event, a message (or other indication) is sent (at 704) indicating the target device connect event. For example, the message can be sent by an expander that is connected to the switch port to which a target device has been added. The message that is sent can be a broadcast change primitive indicating the connection of the target device to the switch port.

Upon receiving the message, the zone manager 140 discovers (at 706) the target device that is connected, and makes a determination (at 708) of whether the zone manager 140 should configure the switch port and associated component(s) to an active zone group. The determination considers several scenarios discussed below.

In a first scenario, which is a single domain scenario, there is just one switch 108 between initiators and storage enclosures (such as the arrangement of FIG. 1). In this first scenario, the zone manager 140 determines (from the zone information 144) if a given active zone group information for the switch port (to which the target device has been added) indicates a zone group that is accessible by zero or one initiator. If so, then the zone manager 140 can properly configure (at 710) the switch port and associated component(s) of the zone group with the given active zone group information (in other words, the configuration of the switch port and associated component(s) is changed from zone group 0 to the given active zone group).

An alternative scenario is a dual domain scenario, where multiple switches are connected to storage enclosures (such as in the FIG. 4 arrangement). In the dual domain scenario, the zone manager (in each of the switches 108A, 108B) checks to see if the respective switch port (of the respective switch 108A or 108B) is accessible by either no initiator or accessible by one and the same initiator(s). In the dual domain scenario, when a storage enclosure is connected to a port of the switch 108A and a port of the switch 108B, these two ports should be accessible by the same initiator (or the same group of initiators in the case of multi-initiator access), or by no initiator—in other words, the active zone group information for these two ports should indicate that the ports are part of the same zone. If the port of the switch 108A is accessible by a first initiator, but the port of the switch 108B is accessible by a second initiator (caused by these ports being part of different zones), then that is an improper connection. The foregoing determination can be made by coordination between the zone managers 140A and 140B over the link 402 shown in FIG. 4. If the zone manager in each switch 108A, 108B determines that the respective port is accessible by either no initiator or by the same initiator(s), then the switch ports of the switches 108A, 108B that are connected to the newly added target device can be configured (at 710) with the corresponding active zone group information.

A third scenario involves a scenario in which an additional domain is added—in such a scenario, a storage enclosure that was initially cabled to a single switch is later modified to connect to another switch. In this case, the zone manager in the second switch applies an active zone group to the newly linked switch port if the conditions for the dual domain scenario discussed above are true.

If none of the conditions above are met, as determined at 708, the zone manager 140 does not apply a previously configured active zone group to the switch port(s), which means that the switch port(s) is (are) maintained at zone group 0, such that the switch port(s) cannot be accessed by any initiator. The determination that the switch port(s) to which a target device has been added cannot be configured with an active zone group means that mis-cabling has occurred, and an alert can be sent (at 712) to a user.

By using techniques or mechanisms according to some implementations, misconnections between switch ports and electronic devices can be detected. Such detection allows for the misconnections to be remedied to allow for proper operation. Also, a switch port involved in a misconnection is maintained in an inactive zone group to prevent any potential data loss at a storage enclosure.

Machine-readable instructions of modules described above (including 140, 140A or 140B in FIG. 1 or 4) are executed on a processor. A processor can include a microprocessor, microcontroller, processor module or subsystem, programmable integrated circuit, programmable gate array, or another control or computing device.

Data and instructions are stored in respective storage devices, which are implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
   detecting, by a network device, connection of an electronic device to a particular port of the network device;
   accessing, by the network device, zone information relating to ports of the network device, wherein the zone information defines plural zones, and wherein each of the plural zones specifies which port of the network device is accessible by which corresponding one or multiple of plural initiators;
   determining, by the network device, whether a misconnection of the electronic device to the network device has occurred based on the accessed zone information; and
   in response to determining that the misconnection has occurred, maintaining, by the network device, the particular port in a state that prevents any access of the electronic device connected to the particular port.

2. The method of claim 1, wherein maintaining the particular port in the state that prevents any access of the electronic device connected to the particular port comprises configuring the particular port with an inactive zone group.

3. The method of claim 1, wherein the network device is a switch having a first set of ports for communication with initiators, and a second set of ports for communication with target devices, wherein the particular port is part of the second set.

4. The method of claim 1, further comprising:
   in response to determining that the misconnection has occurred, sending an alert regarding the misconnection.

5. A method comprising:
   detecting, by a network device, connection of an electronic device to a particular port of the network device;
   accessing, by the network device, zone information relating to ports of the network device, wherein the zone information defines plural zones, and wherein each of the plural zones specifies which port of the network device is accessible by which corresponding one or multiple of plural initiators; and
   determining, by the network device, whether a misconnection of the electronic device to the network device has occurred based on the accessed zone information,
   wherein the electronic device is configured for single-initiator access, wherein the zone information includes first zone information for the particular port, the first zone information specifying that the particular port is to be part of a zone in which multiple initiators are able to access the particular port, and
   wherein determining that the misconnection has occurred is in response to detecting that the electronic device is configured for single-initiator access but the first zone information specifies that the particular port is to be part of the zone in which multiple initiators are able to access the particular port.

6. The method of claim 5, further comprising declining to configure the particular port with the first zone information in response to determining that the misconnection has occurred.

7. The method of claim 6, further comprising:
   prior to connection of the electronic device to the particular port and while the particular port remains disconnected, configuring the particular port with second zone information that specifies that no access is allowed to the particular port.

8. The method of claim 7, further comprising:
- detecting connection of a second electronic device to the particular port, wherein the second electronic device is configured for multi-initiator access; and
- in response to detecting connection of the second electronic device to the particular port, configuring the particular port with the first zone information.

9. A network device comprising:
- a plurality of ports;
- a storage medium to store zone information defining plural zones, wherein each of the plural zones includes at least a respective one of the plurality of ports; and
- a zone manager to:
  - receive an indication of connection of an electronic device to a particular one of the plurality of ports;
  - determine, based on the zone information, whether a misconnection has occurred between the electronic device and the particular port; and
  - in response to determining that misconnection has occurred, maintain the particular port in a state that prevents access of the electronic device.

10. The network device of claim 9, further comprising an expander connected to the particular port, wherein the expander is to send the indication in response to detecting connection of the electronic device to the particular port.

11. The network device of claim 10, wherein the indication comprises a broadcast message.

12. The network device of claim 11, wherein the zone manager is to further:
- in response to determining that misconnection has not occurred, configure the particular port with a respective zone group in the zone information.

13. The network device of claim 12, wherein the configuring of the particular port with the respective zone group allows the particular port to be accessed by at least one initiator.

14. The network device of claim 9, wherein the zone manager is to further:
- determine that the zone information specifies that the particular port is accessible by a particular initiator; and
- communicate with a second network device to determine whether the misconnection has occurred, the communication with the second network device allowing the zone manager to determine whether the electronic device is connected to a port of the second network device that is accessible by the particular initiator or by a different initiator, where misconnection is detected if the port of the second network device is accessible by the different initiator.

15. The network device of claim 9, comprising a switch.

16. The network device of claim 15, wherein the plurality of ports include a first set of ports for communication with initiators, and a second set of ports for communication with storage enclosures, wherein the particular port is part of the second set.

17. An article comprising at least one non-transitory machine-readable storage medium storing instructions that upon execution cause a network device to:
- receive an indication of connection of an electronic device to a particular one of a plurality of ports of the network device;
- determine, based on zone information, whether a misconnection has occurred between the electronic device and the particular port, wherein the zone information defines plural zones, and wherein each of the plural zones includes at least a respective one of the plurality of ports; and
- in response to determining that misconnection has occurred, maintain the particular port in a state that prevents access of the electronic device.

18. The article of claim 17, wherein the instructions upon execution cause the network device to further:
- in response to determining that no misconnection has occurred, configure the particular port with active zone information.

19. The article of claim 17, wherein determining whether the misconnection has occurred comprises communicating with a second network device to determine whether the electronic device is connected to a port of the second network device that belongs to the same zone as the particular port.

* * * * *